INVENTOR
Richard K. Gerlach
BY Louis A. Kline
John J. Matlago
Attorneys

INVENTOR
Richard K. Gerlach
By Louis A. Kline
John J. Matlago
Attorneys

INVENTOR:
Richard K. Gerlach
By Louis A. Kline
John J. Matlago
Attorneys

United States Patent Office 3,011,072
Patented Nov. 28, 1961

3,011,072
REFERENCE PULSE GENERATOR
Richard K. Gerlach, Gardena, Calif., assignor to The National Cash Register Company, Dayton, Ohio, a corporation of Maryland
Filed Dec. 10, 1958, Ser. No. 779,368
6 Claims. (Cl. 307—88.5)

The present invention relates generally to electronic pulse generators, and more particularly to an electronic reference pulse generator for standardizing non-uniform pulses applied to the input thereof.

In the computer art it is frequently desirable to generate electrical clock or timing signals as a result of sensing a periodic magnetic signal recording provided on a memory medium such as tape. A clock signal obtained in this manner from a recording has peaks that occur at evenly spaced time intervals, but often, because of the presence of dust particles, for example, on the surface of the tape, a variation results in the gap between the magnetic read head and the recording. When this occurs the amplitudes and shapes of the signals, having such regularly occurring peaks, vary appreciably and irregularly, and special electronic circuitry must be provided to derive the clock signals therefrom. It is well known in the art how such electrical signals can be amplified and clipped at some level above and/or below a designated base value to obtain a waveform of rectangular pulses, but such rectangular pulses will have different widths or durations and consequently still not be usable in digital computer applications where the shape and spacing of the clock pulses must be uniform. The pulse generator of the present invention is especially designed to respond to such rectangular pulses having different durations and to generate therefrom uniformly shaped output pulses that are suitable as timing signals for computer applications.

It is accordingly an object of the present invention to provide a novel timing pulse generator for generating on the output thereof uniform pulses spaced in time in accordance with the midpoints of varying duration pulses applied to the input thereof.

Briefly, the reference pulse generator of the present invention comprises a circuit having a storage device which is initially in a charged condition. In response to the leading edge of a rectangular input pulse applied to the circuit, the source for charging the storage device is cut off and the storage device starts discharging at a controlled rate. When the storage device has discharged to a predetermined value, an amplifier generates an output pulse, which pulse represents the desired timing signal, and also serves to again connect the charging source to the storage device so as to again charge the storage device in readiness for the next rectangular input pulse. In operation of the pulse generator, if the duration of the rectangular input pulse is the longest duration that can be handled by the circuit, the trailing edge of the rectangular input pulse will fall at the same time that the storage device discharges to the predetermined value. However, if the width or duration of the rectangular input pulse is shorter than that of the rectangular input pulse having the longest duration that can be handled by the circuit, the storage device will not have discharged to the predetermined value when the trailing edge of the rectangular input pulse falls. A current divider is provided in such case to cause the storage device to start discharging more rapidly when the trailing edge of the rectangular input pulse falls, so that the storage device will always discharge to the predetermined value at the instant that the trailing edge of the input pulse having the longest duration that could be handled by the circuit would have fallen if it had been applied to the circuit, instead of the pulse applied in fact. The amplifier, therefore, generates an output pulse when the trailing edge of the input pulse having the longest duration actually falls, in those cases where it is actually applied to the circuit, or when the trailing edge would have fallen if it had been applied to the circuit, in those cases where the rectangular input pulse actually applied to the circuit has a shorter duration. In other words, the amplifier generates an output pulse at a fixed time interval after the midpoint of the rectangular input pulse, irrespective of the duration of the rectangular input pulse.

The above and other features of the invention which are believed to be new are set forth with particularity in the appended claims. The invention itself, however, together with further objects and advantages thereof, may best be understood by reference to the following description when read in conjunction with the accompanying drawings in which:

Figure 1:
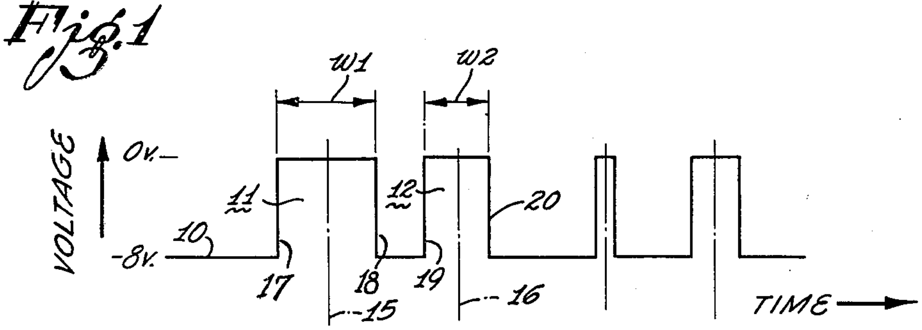
FIG. 1 is a graph of a waveform comprised of rectangular pulses having different widths or durations.

Referring now to the drawings, FIG. 1 shows waveform 10, which includes rectangular pulses 11 and 12 having pulse midlines 15 and 16 and differing durations $w1$ and and $w2$, respectively. Pulse 11 has been chosen to represent the pulse having the longest duration, $w1$, that can be handled by the circuit of the preferred embodiment of the present invention, and pulse 12 has been chosen to represent a pulse having duration shorter than that of pulse 11, for example a duration equal to $w2$. Rectangular pulse 11 has a leading edge 17 and a trailing edge 18. Rectangular pulse 12 has a leading edge 19 and a trailing edge 20. The circuit to be used to generate uniform pulses that are spaced apart by the same time interval as that between midlines of the incoming pulses, such as 15 and 16, will now be described.

Figure 2:
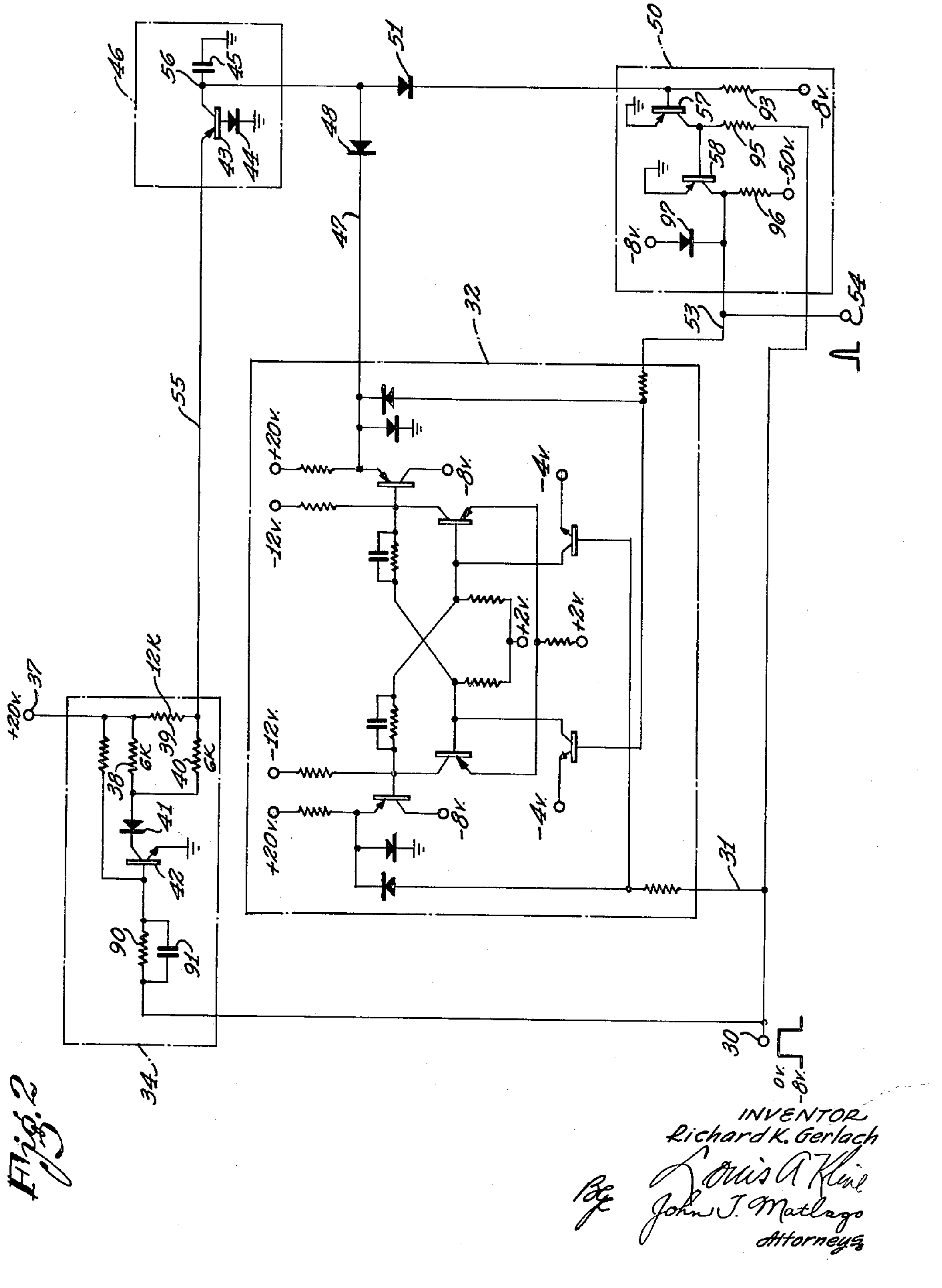
FIG. 2 is a circuit diagram of a reference pulse generator embodying the present invention.

FIG. 2 illustrates a preferred embodiment of the present invention. Input terminal 30 is connected to trigger input 31 of a conventional flip-flop circuit 32. Output lead 47 of flip-flop circuit 32 is connected to the cathode of diode 48, the anode of which is connected to junction 56 connected to one side of capacitor 45. The other side of capacitor 45 is connected to ground. Input terminal 30 is also connected to the base of transistor 42 of current divider 34 through the parallel network of base resistor 90 and base capacitor 91. Terminal 37 of current divider 34 is connected to a +20 volt source and one end each of resistors 38 and 39, the other ends of which are connected to resistor 40. The junction of resistor 40 and resistor 38 is connected to the anode of diode 41, the cathode of which is connected to the collector of NPN transistor 42. The emitter of NPN transistor 42 is grounded. The junction of resistor 40 and resistor 39 is connected to the emitter of PNP transistor 43, the base of which is connected to the anode of diode 44. The cathode of diode 44 is grounded. The collector of transistor 43 is connected to junction 56. Capacitor 45, transistor 43, and diode 44 comprise a ramp circuit 46. Junction 56 is also connected to the anode of diode 51, the cathode of which is connected to the base of PNP transistor 57 of amplifier 50, which base is also connected to a −8 volt source through resistor 93. The emitter of PNP transistor 57 is connected to ground, while its collector is connected to the base of PNP transistor 58 of amplifier 50 and also to input terminal 30 through resistor 95. The emitter of PNP transistor 58 is connected to ground while its collector is connected to a −50 volt source through resistor 96, to a −8 volt source through clamping diode 97, to trigger input 53 of flip-flop circuit 32, and to output terminal 54.

The circuit of FIG. 2 is designed so that input terminal 30 is normally at a potential of −8 volts and flip-flop circuit 32 is initially in a stable state with the low potential of −8 volts on output conductor 47. This low potential on output conductor 47 of flip-flop circuit 32 will charge capacitor 45 to a potential of −8 volts. During the time that input terminal 30 is at the potential of −8 volts, NPN transistor 42 is biased so as to appear as an open circuit to ground for the voltage source connected to terminal 37, which in effect places resistor 39 in parallel with resistors 38 and 40, with respect to conductor 55. The network of resistors 38, 39 and 40 determines the magnitude of the current flowing into PNP transistor 43 through conductor 55 from the voltage source connected to terminal 37.

When the leading edge of a rectangular pulse of waveform 10 (FIG. 1) is applied on input terminal 30, flip-flop circuit 32 triggers into its opposite stable state characterized by the voltage on the output conductor 47 swinging to 0 volts. With flip-flop output conductor 47 at a potential of 0 volts the source for charging capacitor 45 is cut off. Further, because of the back biasing of diodes 48 and 51, capacitor 45 cannot discharge into either flip-flop circuit 32 or amplifier 50. The leading edge of the rectangular pulse of waveform 10 applied on input terminal 30 simultaneously drives the base of NPN transistor 42 positively, causing NPN transistor 42 to act as a short circuit to ground for the current path from terminal 37. Under these conditions both ends of resistor 40 will be at the same potential above ground, and there will thus be no current flow through resistor 40, causing the circuit to appear as if resistor 40 was removed, the resistance 39 alone determining the current flow in conductor 55. In the preferred embodiment a value of 12,000 ohms is used for resistor 39 and a value of 6000 ohms is used for each of resistors 38 and 40. Thus, when transistor 42 acts as an open circuit, the resistance between terminal 37 and the emitter of transsistor 43 is 6000 ohms, while when transistor 42 acts as a short circuit, the resistance between terminal 37 and the emitter of transistor 43 increases to 12,000 ohms. Thus, the resistance between 37 and 55 doubles in magnitude when transistor 42 acts as a short circuit. This causes the current flowing from terminal 37 to the emitter of transistor 43 to fall to half its former value. Since capacitor 45 is no longer being charged, it starts to discharge through the collector of transistor 43 at a constant rate, thereby changing the potential at junction 56 linearly. In accordance with one of the inherent characteristics of a transistor, transistor 43 functions as a constant current generator, and thus the rate at which capacitor 45 discharges is determined by the magnitude of the current flowing through conductor 55.

With the fall of the trailing edge of the rectangular pulse applied on input terminal 30, transistor 42 once again acts as an open circuit, causing the current flowing through conductor 55 to double to its former value. This doubling in current allows capacitor 45 to discharge twice as fast, thereby changing the voltage at junction 56 twice as fast.

Amplifier 50 is designed so that when capacitor 45 is negatively charged by flip-flop circuit 32 such that the voltage at junction 56 is −8 volts, PNP transistor 57 will be conducting through resistor 95 and raising the potential applied to the base of PNP transistor 58 such that the latter will not be conducting. Amplifier 50 is further so designed that when the voltage at junction 56 reaches 0 volts, transistor 57 stops conducting and transistor 58 starts conducting. The output of transistor 58 simultaneously produces a pulse at output terminal 54 and triggers flip-flop circuit 32 into its first stable state. The output of flip-flop circuit 32 thus starts to charge capacitor 45 to −8 volts once again. This causes the potential at junction 56 to fall below 0 volts, which causes transistor 58 to stop conducting. The result is a sharply peaked pulse at output terminal 54, and the circuit is ready to receive the next rectangular pulse at input terminal 30.

Figure 3:
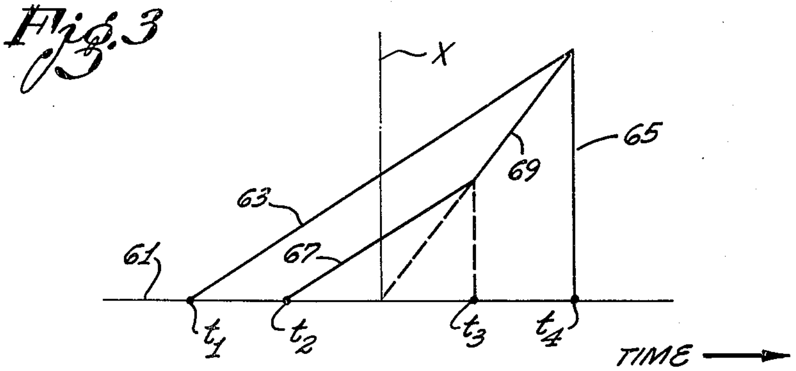
FIG. 3 is a graph of a ramp function associated with the waveform of FIG. 1.
Figure 4:
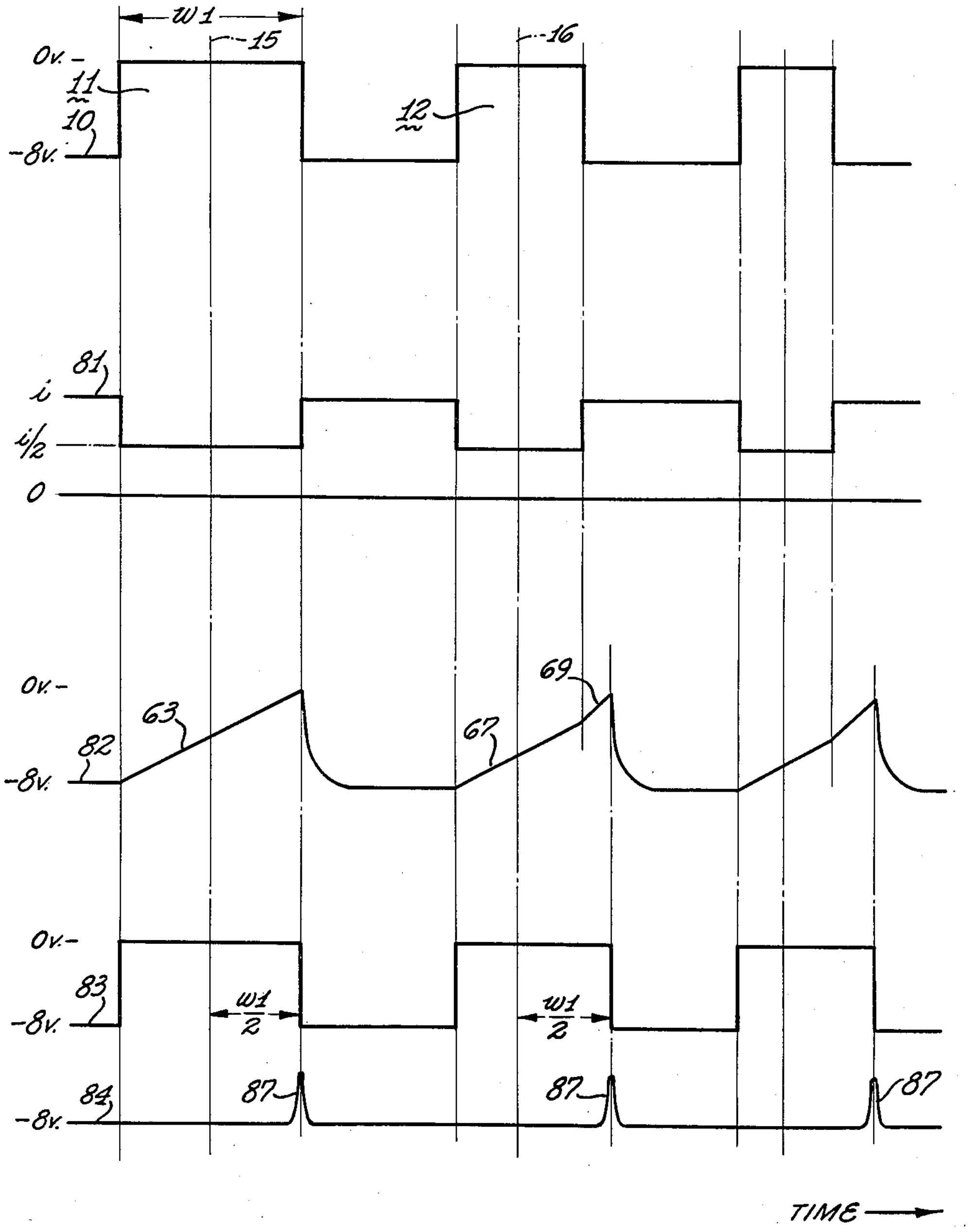
FIG. 4 is a graph of the waveform obtained at various points of the circuit of FIG. 2.

The operation of FIG. 2 will be better understood by referring next to FIGS. 3 and 4, wherein FIG. 3 shows a graph in which midlines, such as 15 and 16, of the rectangular pulses of FIG. 1 are assumed for purposes of explanation to be coincident with the vertical axis X, and horizontal time axis 61 has been shown with time increasing towards the right. At time $t_1$, leading edge 17 of pulse 11 of FIG. 1 is applied to input terminal 30 of FIG. 2 and causes capacitor 45 of FIG. 2, which has a negative charge of −8 volts thereon, to discharge linearly towards 0 volts. The discharge of capacitor 45 is represented graphically in FIG. 3 by the slope of line 63. Times $t_1$ and $t_4$ are equidistant from line X corresponding to midline 15, and accordingly, trailing edge 18 of pulse 11 will abruptly fall at time $t_4$, as shown by line 65. Since the circuit of the present invention has been designed to handle a pulse having the maximum width of pulse 11, in response to such a pulse, the current divider 34 always operates with transistor 42 in a short circuited condition, such that the current flow in conductor 55 is fixed according to the resistance 39.

FIG. 3 will now be utilized to describe the effect upon the circuit of FIG. 2 of applying a pulse of less than maximum duration at input terminal 34. For purposes of explanation, assume that at time $t_2$ leading edge 19 of pulse 12 of FIG. 1 is applied to input terminal 30 of FIG. 2 and causes capacitor 45 of FIG. 2 to discharge linearly, as previously described. This discharge of capacitor 45 is represented graphically in FIG. 3 by the slope of line 67. The slopes of lines 63 and 67 are equal. Times $t_2$ and $t_3$ are equidistant from line X corresponding to midline 16, and hence, trailing edge 20 of pulse 12 falls to −8 volts at time $t_3$. Since the current through conductor 55, when input terminal 30 is at a potential of −8 volts, is twice as great as the current through conductor 55 when input terminal 30 is at a potential of 0 volts, capacitor 45 starts to discharge twice as fast at time $t_3$. This new discharge of capacitor 45 is represented graphically in FIG. 3 by the slope of line 69, which is twice the slope of line 67. It can be seen from the geometry of FIG. 3 that line 69 will intercept line 63 at time $t_4$, as shown by line 65. Thus, regardless of whether pulse 11 or 12 or any other pulse having a duration less than duration $w1$ is involved, capacitor 45 will discharge to 0 volts at time $t_4$. Furthermore, this is true whether capacitor 45 discharges linearly, as shown, or exponentially.

FIG. 4 shows the interrelations of waveforms 10, 81, 82, 83, and 84. Waveform 10 is shown with pulse 11 having midline 15 and pulse 12 having midline 16. Waveform 81 represents the current flowing through conductor 55 of FIG. 2. Waveform 82 represents the voltage present at junction 56 of FIG. 2. The slopes of lines 63, 67, and 69 of waveform 82 have been explained in conjunction with FIG. 3. Waveform 83 represents the voltage on output conductor 47 of flip-flop circuit 32 of FIG. 2. Waveform 84 represents the voltage pulses present at output terminal 54 of FIG. 2. It can be seen from FIG. 4 that each sharply peaked output pulse 87 of waveform 84 occurs at the same time interval $w1/2$ after the midline of the respective rectangular input pulse which controlled its generation, and that time interval $w1/2$ is equal to one-half the duration $w1$ of the longest rectangular input pulse 11 for which the generator was designed to handle.

If the midlines of the rectangular input pulses of waveform 10 are all equidistant, as would be the case if waveform 10 were obtained from a clock channel, sharply peaked output pulses 87 of waveform 84 will be equidistant, regardless of the time durations of the various rectangular pulses of waveform 10. If the midlines of the rectangular pulses of waveform 10 are not equidistant as may be the case when the generator of the present invention is applied for purposes other than standardizing clock signals derived from recordings, the time interval between any two sharply peaked output pulses 87 of waveform 84 can be measured to ascertain the time interval between the midlines of the corresponding two input rectangular pulses of waveform 10, regardless of the time durations of these rectangular pulses.

While a specific embodiment of an electronic reference pulse generator has been shown and described, it will, of course, be understood that various modifications may be made without departing from the invention. The appended claims are, therefore, intended to cover any such modifications within the true spirit and scope of the invention.

What is claimed is:

1. A pulse generating circuit comprising: a storage means for holding an electrical charge; a bistable state circuit having an output indicative of a first and a second trigger state thereof; means connecting said storage means to the output of said bistable state circuit when in said first trigger state to enable said storage means to become electrically charged; a discharging circuit for providing current to discharge said storage means at a first or a second rate; an input line for rectangular pulses; means responsive to the leading edge of each said rectangular pulse for triggering said bistable state circuit to said second trigger state; means also responsive to the leading edge of each said rectangular pulse for enabling said discharging circuit to provide current for discharging said storage means at said first rate; means responsive to the trailing edge of each said rectangular pulse for enabling said discharging circuit to provide current for discharging said storage means at said second rate; an output line; and means responsive each time said storage means becomes discharged to provide a pulse for triggering said bistable state circuit back to said first trigger state and for simultaneously providing a pulse on said output line.

2. A reference pulse generator comprising: means for supplying a waveform of rectangular input pulses; a capacitor; a flip-flop circuit connected to charge said capacitor when in one of its trigger states; circuit means providing a high or a low impedance path for discharging said capacitor; means effective in response to the potential of the leading edge of each of said input pulses to trigger said flip-flop circuit to the opposite trigger state; means also effective in response to the potential of the leading edge of each of said input pulses to cause said circuit means to discharge said capacitor through said high impedance path, and further effective in response to the potential of the trailing edge of each of said input pulses to cause said circuit means to discharge said capacitor through said low impedance path; means effective in response to the potential on said capacitor when discharged to provide a pulse for triggering said flip-flop circuit back to said trigger state effective to charge said capacitor; and further means effective in response to the potential on said capacitor when discharged to provide an output pulse.

3. An electrical pulse-generating circuit comprising: first means, including a signal line on which are supplied periodic rectangular electric pulses having various time durations and each pulse demarked by a commencement and a termination; second means, including means connected to said signal line and effective in response to an output sigal to provide capacitor-charging current; third means, including capacitor means connected to be charged by said current; fourth means, including variable-impedance and power means, connected to said signal line and to said third means and effective in response to and during supplying of a said electric pulse to tend to discharge said capacitor means at a first rate and effective in response to termination of the said electric pulse to discharge said capacitor means at substantially double said first rate; and fifth means connected to said capacitor means and to said second means and effective in response to discharge of said capacitor means to generate an output signal effective on said second means.

4. A circuit according to claim 3, said second means comprising a bistable-state circuit means triggered to a capacitor-charging state by the said output signal, and including a connection to said fifth means whereby said bistable-state circuit means is triggered to its opposite state incident to generation of said output signal.

5. An electrical pulse-generating circuit comprising: first means, including capacitor means; second means, including bistable-state circuit means normally in a first state, connected to said first means and effective only when in a second state to charge said capacitor means; third means, including power means and variable-impedance means, for supplying capacitor-discharging current at a first rate when in a first condition in response to an applied signal and at double the first rate in response to cessation of the applied signal, whereby said capacitor means may be discharged at first and second rates; fourth means, including pulse-producing means, connected to said first and second means and effective to generate an output pulse incident to discharge of said capacitor means and to thereby trigger said bistable-state circuit to said second state; and fifth means, including an input line connected to said second means, to said third means, and to said fourth means, and effective to translate periodic square-wave input pulses thereon to the said means connected thereto, whereby in response to an input pulse, a signal is applied to said third means and the leading portion of an input pulse triggers said bistable-state circuit means to its said first state and initiates discharge of said capacitor means.

6. An electrical pulse-generating circuit adapted to receive a succession of periodic rectangular electric input pulses of various durations within a maximum duration-limit and in response thereto produce a corresponding succession of output pulses at intervals corresponding to the intervals separating mid-points of the input pulses, said circuit comprising: first means, comprising capacitor means; second means, including an input line on which said input pulses of various durations occur; third means, including power means and means connected to said first means and to said second means and capable only during absence of an input pulse on said line to supply charging current to rapidly charge said capacitor means following termination of an input pulse and maintain the capacitor means charged during absence of a said input pulse; fourth means, including current supply means, connected to said first means and to said second means and effective to supply current tending to discharge said capacitor means at a first rate during presence of an input pulse on said first means and at twice the first rate during absence of an input pulse on the first means; and fifth means, connected to said first and second means and effective in response to discharge of said capacitor means to produce an output pulse and including means effective in response to said output pulse to induce supply of charging current by said third means.

References Cited in the file of this patent

UNITED STATES PATENTS

| | | |
|---|---|---|
| 2,827,574 | Scheider | Mar. 18, 1958 |
| 2,845,548 | Sillman et al. | July 29, 1958 |
| 2,871,378 | Lohman | Jan. 27, 1959 |
| 2,949,547 | Zimmermann | Aug. 16, 1960 |